April 6, 1943.  W. S. WHITE  2,315,570
INTERMITTENT FLOW VALVE
Filed April 22, 1940  5 Sheets-Sheet 1

INVENTOR:
WILLIAM S. WHITE
BY
Rollandet, McGrew & Campbell
ATTORNEYS

April 6, 1943. W. S. WHITE 2,315,570
INTERMITTENT FLOW VALVE
Filed April 22, 1940 5 Sheets-Sheet 3
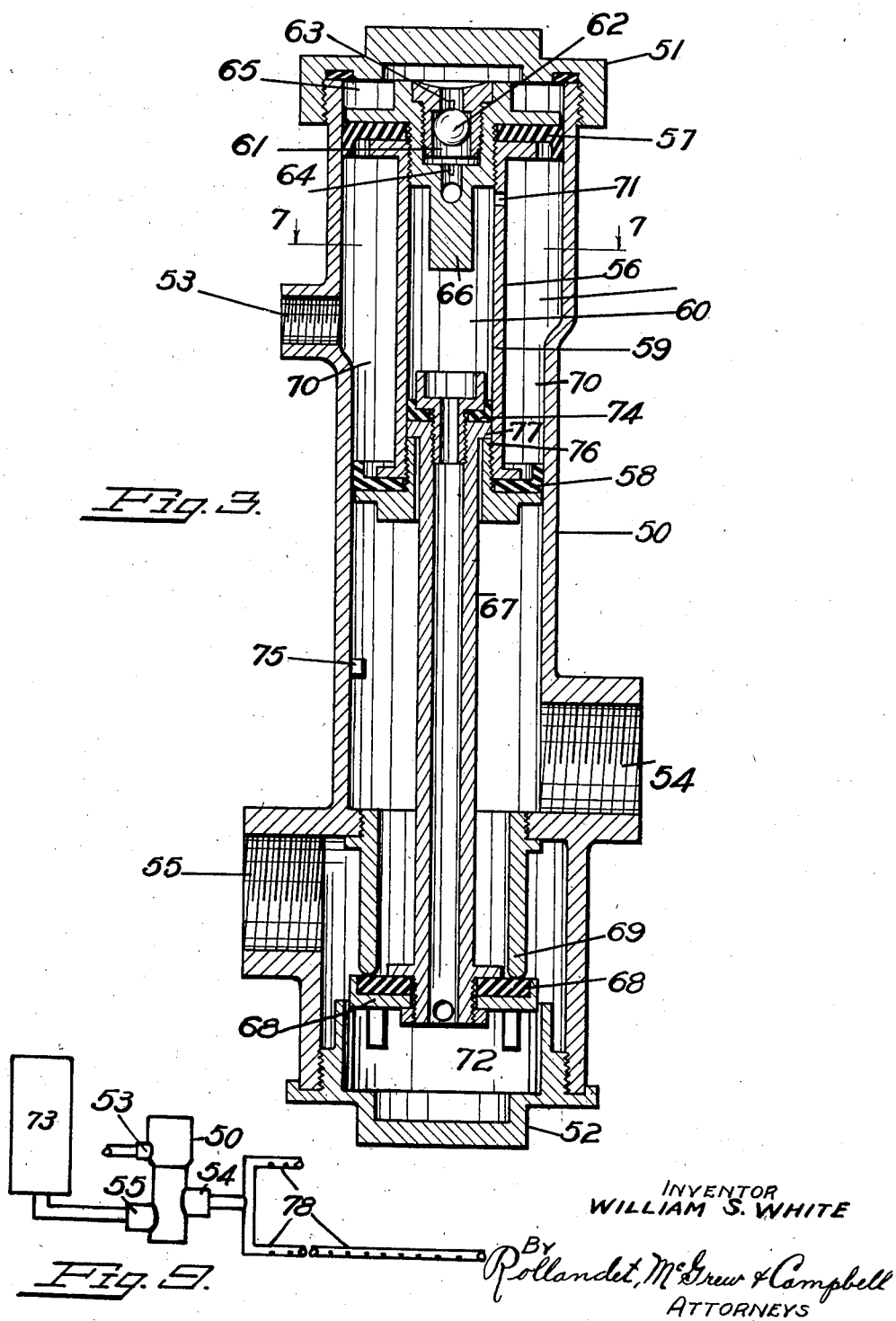
INVENTOR
WILLIAM S. WHITE
By Rollandet, McGrew & Campbell
ATTORNEYS

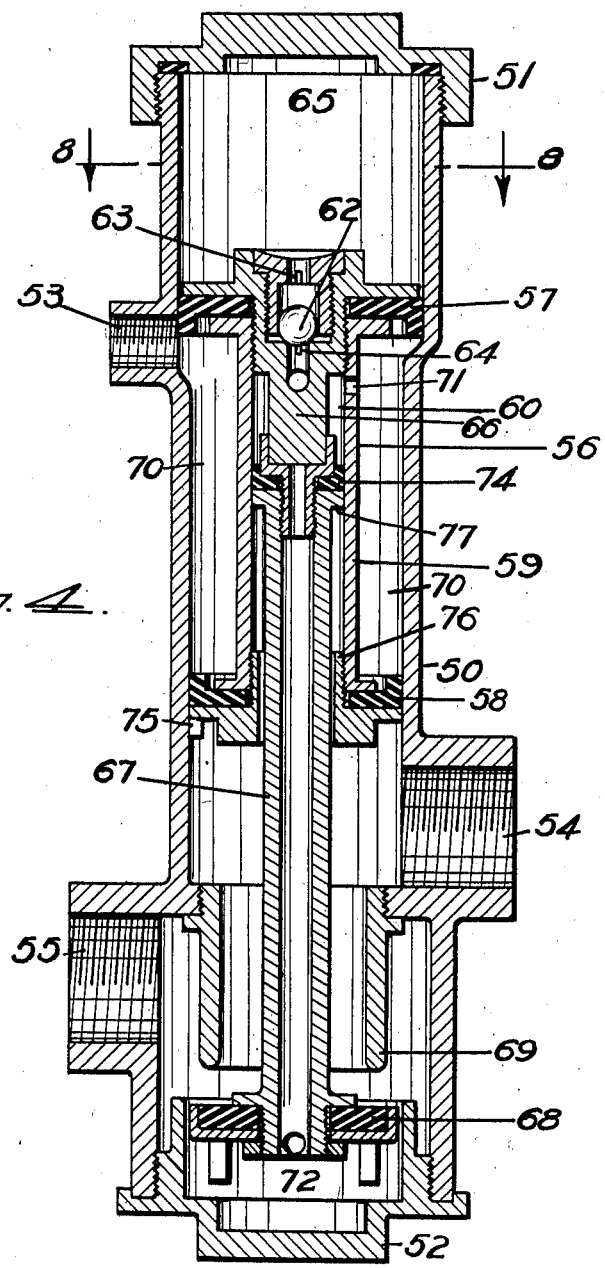

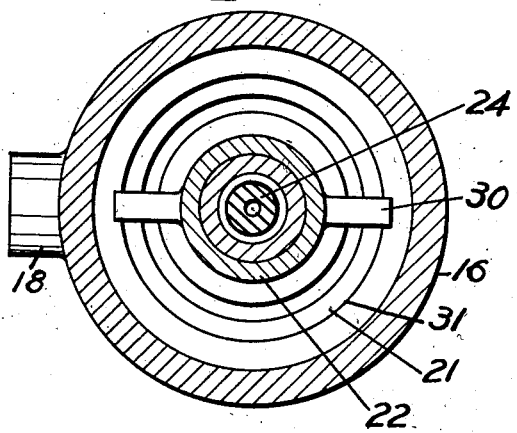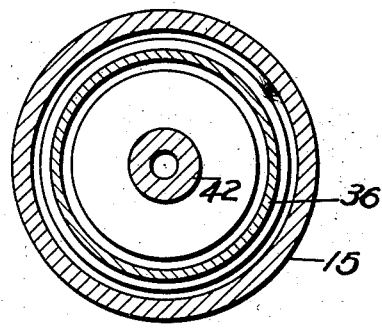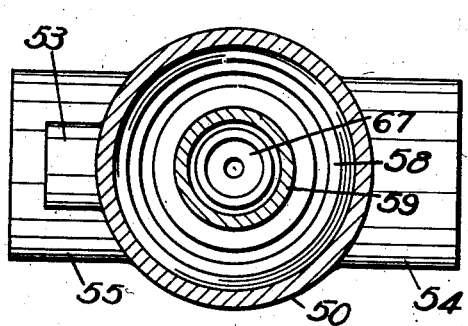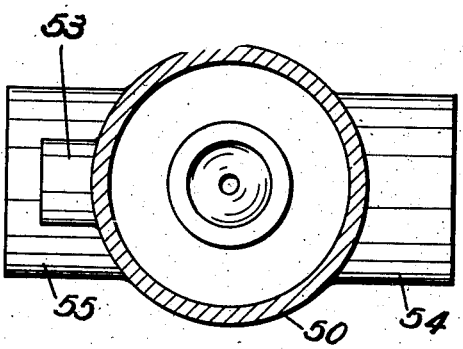

Patented Apr. 6, 1943

2,315,570

UNITED STATES PATENT OFFICE 2,315,570

INTERMITTENT FLOW VALVE

William S. White, Denver, Colo.

Application April 22, 1940, Serial No. 330,982

6 Claims. (Cl. 137—145)

This invention relates to improvements in automatic intermittent flow valves.

A primary object of the invention is to provide an intermittent flow valve that is dependably operable and that overcomes certain deficiencies in such valves as heretofore known. Some of the difficulties experienced heretofore with certain valves of this type are that they have been subject to failure due to clogging by dirt or foreign matter in the water passing therethrough, they have wasted water, they have been liable to cause water-hammer in the pipe lines with which they are connected, and have in general, been more or less unreliable.

Another, more specific object is to provide an intermittent flow valve that is self-cleaning.

A further object is to provide a valve of this character that operates with precision and practically eliminates the occurrence of water-hammer in the pipelines with which it is connected.

Still another object is to provide an intermittent flow valve that passes a minimum of water, thus desirably conserving the amount of water used to accomplish a given purpose.

Other objects and advantages reside in details of design and construction which cooperate to improve the general dependability of valves made according to this invention, and which will be clearly understandable as this description progresses.

In the accompanying drawings to which the description refers, like parts have been similarly designated.

In the drawings:

Figure 1 is a vertical section through a valve made according to a preferred form of the present invention, providing for a relatively quick-acting flush valve for urinals or the like;

Figure 3 is a vertical sectional view of an intermittent flow valve made according to a modified form of this inventive concept as particularly adapted for lawn sprinkling, irrigation and the like;

Figure 4 is a vertical sectional view of the same valve illustrated in Figure 3, showing the mechanism thereof in another operating position;

Figure 5 is a cross sectional view taken along the line 5—5 of Figure 1;

Figure 6 is a cross sectional view taken along the line 6—6 of Figure 1;

Figure 7 is a cross sectional view taken along the line 7—7 of Figure 3;

Figure 8 is a cross sectional view taken along the line 8—8 of Figure 4; and

Figure 9 is a diagrammatic view on a greatly reduced scale, illustrating the valve shown in Figures 3 and 4 connected with an irrigation system which it intermittently serves with water.

In order to disclose operative reductions to practice of this inventive concept, the valves illustrated in the accompanying drawings will be described. However, since numerous changes in details could be made, the instant examples are not intended to express or imply any limitation to the invention, the scope of which is in reality measured by the appended claims.

Numerous uses may be found for valves made according to this invention and the invention is by no means limited to any specific type of installation. However, for purposes of illustration, one form of the valve is illustrated and will be described as particularly well adapted for intermittent flushing of public urinals, and another valve made according to the invention will be set forth as it would be designed and used to provide for intermittent flow of water for sprinkling lawns or for other irrigation purposes, particularly where conservation of water is an important consideration.

Figure 1:
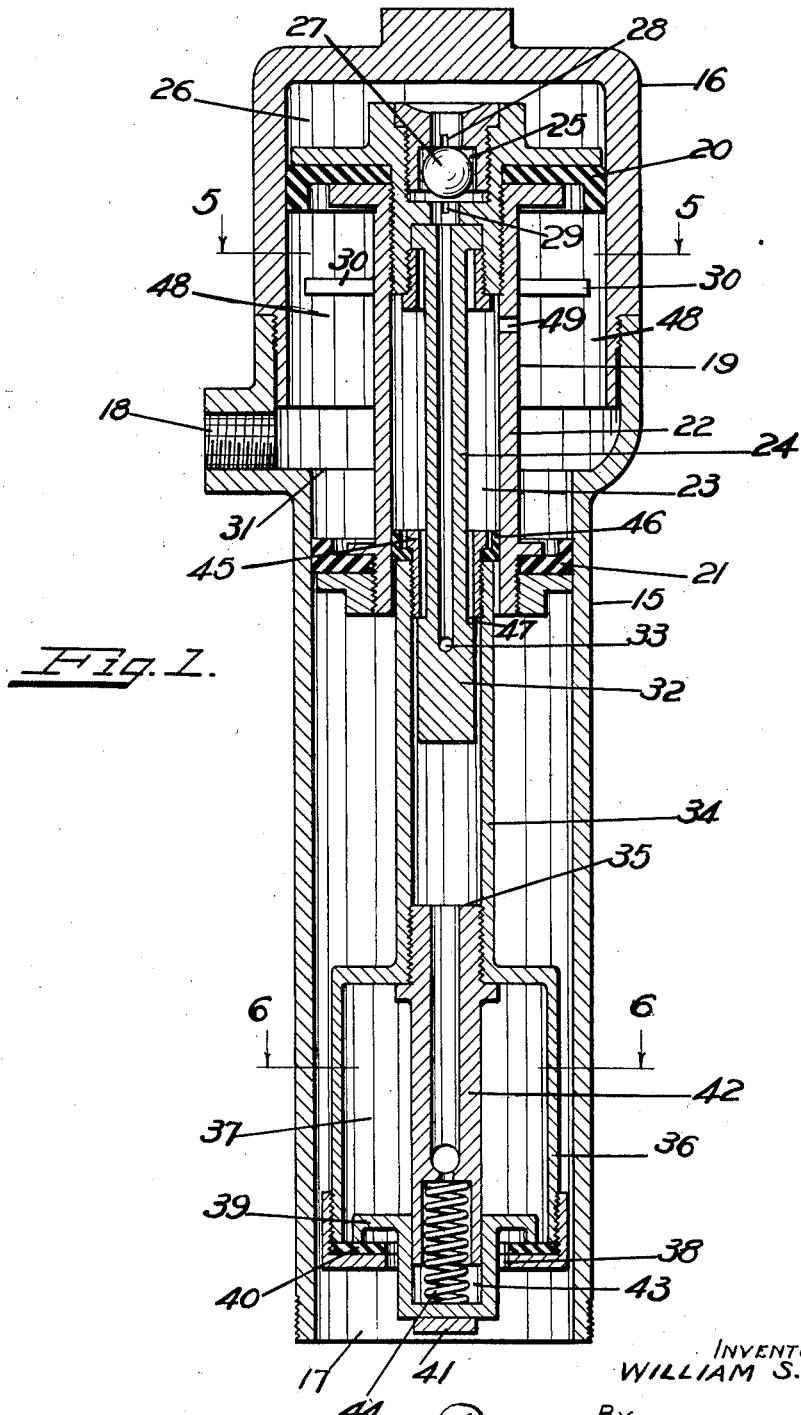
Figure 2:
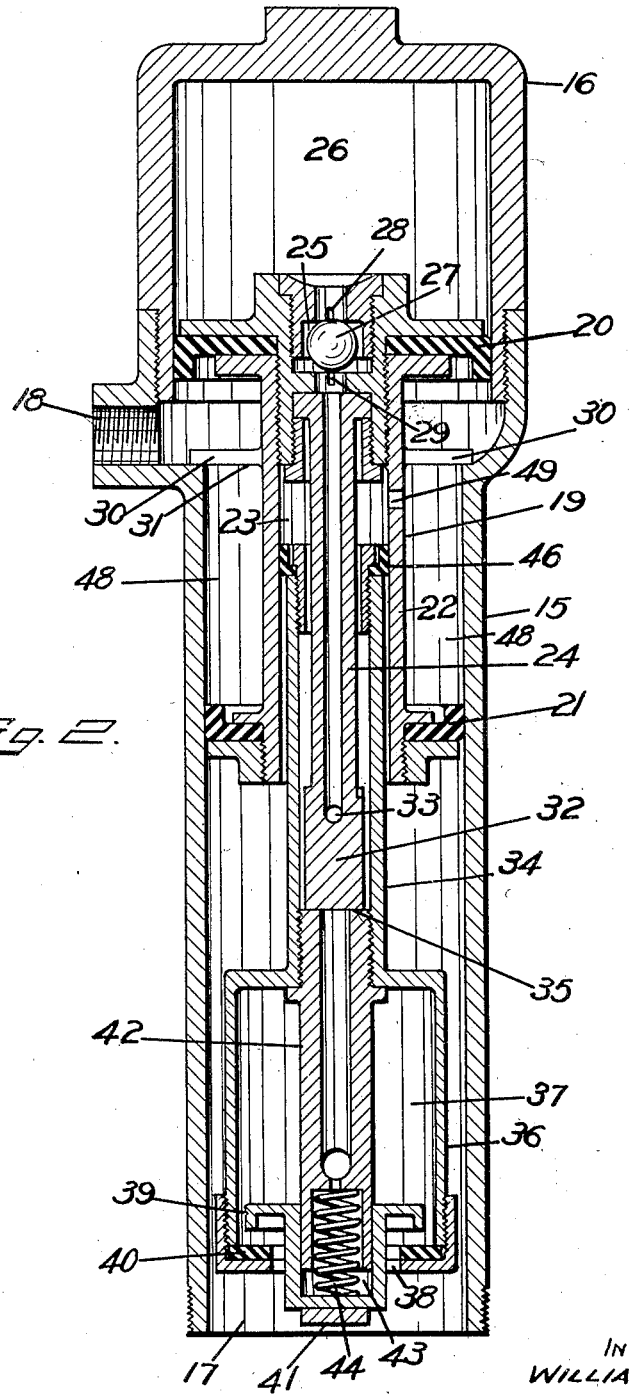
Figure 2 is a vertical section through the same valve illustrated in Figure 1 and showing the mechanism thereof in another operating position.

Referring first to Figures 1 and 2, reference character 15 denotes a cylindrical valve body as a whole, provided with a threaded upper closure 16, and open at the bottom 17 for connection with a urinal flushing system or anything else to be served by the valve.

A threaded connection 18 is provided in the valve body 15 for connection with a source of water under pressure, such as a public water system.

A piston element designated as a whole by reference character 19 is mounted for normally vertical reciprocating movement within the closure 15—16, and includes an upper cup washer 20 which engages the interior cylindrical walls of the closure 16, which is greater in diameter than the bore of the valve body 15. A second and lower cup washer 21 is also a part of the piston assembly 19, and is positioned to engage the inner cylindrical walls of the valve body 15 and is therefore of less diameter than the cup washer 20.

These two cup washers 20 and 21 are cupped toward each other and are held in predetermined spaced relationship, the washer 20 above the supply connection 18 and the washer 21 below said connection, by a hollow member 22 providing therein a chamber 23.

Within the hollow member 22 and extending longitudinally therethrough is a vertically positioned tubular member 24 which opens at its upper end into a valve chamber 25 within the piston assembly 19, which in turn opens into a control chamber 26 above the cup washer 20 and the piston assembly 19 within the closure 16.

The valve chamber 25 includes two vertically spaced valve seats, between which a ball valve 27 is operatively positioned. Relatively small bleeder by-passes 28 and 29 are positioned in the upper and lower valve seats respectively, so that the ball valve 27 cannot provide a complete closure in any position.

A bar-like stop 30 is carried on the piston assembly 19 in a position to contact a shoulder 31 in the valve body 15, to limit the downward movement of said piston assembly.

The lower extremity of the tubular member 24 is provided with an enlarged end 32, which forms a bottom closure for the tubular member, but which is provided with a cross bore 33 which connects the interior of the tubular member 24 with the exterior of the enlarged end thereof 32.

The enlarged end 32 of the tubular member 24 is positioned loosely in a movable second tube 34 that is provided with an inwardly extending shoulder 35, and which connects with a cylindrical enlargement 36 providing a chamber 37, all of which structure is movable with reference to the valve body 15.

The bottom of the cylindrical enlargement 36 is provided with an opening 38, which is controlled by a discharge check valve 39 which is normally seated on a gasket 40 carried upon the bottom of said enlarged portion within the chamber 37. The check valve 39 is held stationary with reference to the valve body 15 by a cross-bar 41 attached to said valve body against which the check valve bears.

An extended tubular portion 42 of the movable tube 34 extends centrally down through the chamber 37 and is in conductive communication with said chamber. The lower end of the extension 42 terminates in the hollow center 43 of the check valve 39, and a compression spring 44 is positioned in said hollow center 43 of the check valve 39 and bears upwardly against the countersunk lower extremity of the tubular extension 42, keeping valve part 39 against the stop 41.

At the upper end of the movable tube 34, which is positioned within the hollow piston member 22, is a plug 45 screwed into said movable tube 34 in loosely spaced relationship around the tube 24 and providing an inwardly projecting shoulder against which the enlarged end 32 of said tube 24 sometimes abuts.

A relatively small cup washer 46 is held on the upper end of the movable tube 34 by the plug 45 in piston-like engagement with the inner cylindrical surface of the hollow member 22 for movement within the chamber 23. A small bleeder notch 47 is provided in the enlarged end 32 of the tube 24, where it abuts the plug 45 so that this abutting relationship does not provide a complete and absolute seal. The tubular member 34—42, is, in reality, a stem for the discharge valve 39—40.

More briefly stated, the structure thus defined provides a double-acting hollow piston element 19, inclusive of the tube 24, that is movable with reference to the cylindrical valve housing 15, and with reference to the movable discharge valve-element assembly 34—35—36—37—40—45—46, and said assembly 34—35—36—37—40—45—46 is movable with reference to said piston assembly 19 and with reference to said main valve body 15, but the valve part 39 is stationary with reference to valve body 15. The supply connection or inlet 18 is so positioned with reference to the piston cup washers 20 and 21 that it is always intermediate said washers in all positions of the piston element 19.

As water enters the valve through inlet 18 it fills annular inlet chamber 48, which is the space within the valve body enclosure between the cup washers 20 and 21. From chamber 48, water flows through drilled hole 49 in a wall of the hollow piston member 22 which is of considerably less diameter than that of the valve body 15 or its closure 16, to enter chamber 23 thence it flows downwardly between the exterior of tube 24 and the interior surface of plug 45, through notch 47 past enlarged end 32 of tube 24 down through movable tube 34 and extension 42 into chamber 37.

After these parts are filled, water enters through cross-bore 33 into tube 24 and rises into valve chamber 25, elevating ball valve 27 to its upper seat thus establishing a slow bleed feed through bleeder notch 28 up into control chamber 26 above the piston assembly 19, which control chamber obviously is expansible as the piston assembly moves downwardly. This situation establishes a substantially equal pressure on both sides of upper cup washer 20, but lower cup washer 21 has water pressure only on its upper surface from chamber 48. This unbalanced pressure condition causes cup washer 21 to move the entire piston assembly 19 slowly down in the valve body 15, since the valve body below the piston assembly 19 is open to the atmosphere through its open lower end 17 which is connected with the fixture to be flushed.

The downward movement of the piston assembly 19 is slow and governed by the rate with which water is by-passed through notch 28 into upper chamber 26. This downward movement of the piston element 19 obviously carries with it the lower enlarged end 32 of tube 24, and as downward movement continues slowly, the part 32 contacts the shoulder 35 in the movable tube 34, as illustrated in Figure 2, and acts upon the movable assembly 34—35—36—37—40—45—46 to push it downwardly with reference to the valve body 15 and the stationary check valve 39, thus pushing the seating gasket 40 away from its seat on valve part 39, releasing water from chamber 37. The valve part 39 may be considered the seat and the movable gasket 40 the valve. The members 39 and 40 together provide a discharge valve. Downward movement of the piston element 19 is halted when the stop 30 contacts the shoulder 31 in the valve body 15, as illustrated in Figure 2.

With the part 32 bearing against the shoulder 35, as illustrated in Figure 2, the passage through movable tube 34—42 is temporarily closed, whereupon pressure of the water in chamber 23 against cup washer 46 acts to move the movable assembly 34—35—36—37—40—45—46 further down, thus separating the part 32 from the shoulder 35 and moving the seat gasket 40 still further away from the stationary check valve 39. In this position, an open passage is temporarily established from the inlet 18 through the entire valve mechanism to the discharge 17, and thence to the fixture to be flushed. It is manifest that while the parts are in this open position, the flow period is occurring.

Next, the closing cycle begins. Water in chamber 26, which is greatly enlarged when the mechanism is in its open or flow position, is free to flow down past ball valve 27 which moves to its lower seat. The water pressure in chamber 48 exerts a greater pressure on larger cup washer 20 than the pressure exerted on the smaller cup washer 21, which unbalanced condition slowly moves the entire piston assembly 19 upwardly as the water from chamber 26 flows past ball valve 27 through bleeder notch 29, tube 24, movable tube 34, extension tube 42, to mingle with the general flow coming from inlet 18 through hole 49 through chamber 23, tube 34, extension 42, past the open check valve 39 and out through discharge 17 to the fixture being flushed.

During the early stage of this return movement of the piston assembly 19, the movable tube 34 and its associated parts, inclusive of valve seat gasket 40, are being held down by water pressure exerted against cup washer 46. As the piston assembly 19, inclusive of the part 32, continues to move upwardly, said part 32 will abut plug 45 and begin to raise said plug and its associated movable parts inclusive of valve seat gasket 40, thus gradually curtailing the flow of water past check valve 39.

When the part 32 is in abutting relation with the plug 45, the direct flow of water from chamber 48 through hole 49 is greatly reduced, but as the piston assembly 19 continues to rise, the water from chamber 26 will continue to be forced down past ball valve 27 through tubes 24 and 34 into chamber 37.

As pressure begins to build up in chamber 37 above check valve 39, said chamber 37 tends to close itself, because its cross sectional area is greater than the area of relatively small cup washer 46. Thus the pressure in chamber 37 gradually begins to overcome the pressure in chamber 23 within the hollow piston member 22.

Since the direct flow of water from inlet 18 has been substantially reduced and the flow of water from chamber 26 is at all times relatively small, the final closing of the check valve 39 will cut off only a small flow of water, which will produce no water-hammer in the system.

Since the ball valve 27 is a double-acting valve, around which water flows alternately in opposite directions, its chamber 25 and its by-passes 28 and 29 have little or no tendency to become clogged by dirt or foreign matter in the water. Valve 27 and its associated parts are, therefore, substantially self-cleaning, thus adding an important factor to the dependable operation of valves made according to this disclosure.

The entire mechanism works with dependable precision and the duration of the cycles automatically performed by these improved valves may be selectively determined by structural dimensions, particularly the capacity of the bleeder notches 28 and 29.

Notch 47 in member 32 may be provided to facilitate the beginning of each cycle as herein set forth. However, due to the self-closing tendency of the chamber 37, the various movable parts can be so proportioned that at the final stage of closing, the chamber 37 by its water pressure actuated upward movement will raise the plug 45 up off the enlarged part 32. This action would be the final stage in the closing movement of the valve and with plug 45 slightly spaced above enlarged part 32, the opening cycle would be ready to start. Therefore, the notch 47 in the part 32 is not essential and may be omitted under some circumstances.

Next referring to Figures 3 and 4, a modified form of the present inventive concept is illustrated as embodied in a valve that has a wide variety of uses, but particularly is well adapted for use in connection with lawn sprinkling systems or other irrigation works.

The fundamental components in this modified valve are very similar to those of the valve illustrated in Figures 1 and 2 and hereinbefore described. However, in order to avoid any possibility of confusion, the various components in the valve of Figures 3 and 4 will be given entirely different reference characters.

Accordingly, reference character 50 denotes a hollow cylindrical valve body having an upper closure 51 and a lower closure 52. The valve body is provided with a threaded inlet 53 that is provided for attaching the valve to a source of water under pressure, and the valve body is further provided with a discharge outlet 54 conveniently threaded for the purpose of connection with the fitting or system to be served by the valve.

Another connection 55 is provided in the valve body 50 and is conveniently threaded for connection with a closed pressure tank, not shown, but which will be hereinafter clearly set forth.

A piston element 56, which includes an upper cup washer 57 and a lower cup washer 58 of lesser diameter, is mounted for limited reciprocating movement in the valve body 50, the upper portion of which has a larger internal diameter than the intermediate portion.

The cup washers 57 and 58 are held in spaced relationship by a hollow piston member 59 providing an internal chamber 60. The cup washers 57 and 58 are so positioned that they are above and below the inlet connection 53.

Carried upon the piston element 56 adjacent the upper head thereof is a valve chamber 61, inclusive of upper and lower spaced seats between which is a ball valve 62 positioned to cooperate with said seats. These valve seats are provided with bleeder notches 63 and 64 respectively, so that the ball valve 62 cannot form an absolute seal in any position.

The valve chamber 61 opens below into the inner chamber 60 within the hollow piston member 56, and said valve chamber 61 opens above into an expansible control chamber 65.

Within the chamber 60 a downwardly projecting pusher member 66 is carried on the piston assembly and is so positioned that it will contact the open upper end of a tubular valve stem 67 which is connected with a discharge valve 68. A seat 69 is provided for said discharge valve 68.

The tubular valve stem 67 completes a passage from inlet connection 53 through annular inlet chamber 70 that is defined by the piston element 56 through drilled hole 71 in hollow piston member 59, through chamber 60 to chamber 72 below the discharge valve 68. The chamber 72 is in communication with the connection 55 which leads to a closed accumulator pressure tank 73, not shown in Figures 1 and 2, but illustrated diagrammatically in Figure 9.

The upper end of tubular valve stem 67 is provided with a cup washer 74 so that it is in sliding piston-like relationship with the inner cylindrical surface of the hollow piston member 59. A stop 75 may be provided within the valve body 50 to limit the downward movement of the piston element 56.

In operation, water under pressure is admitted through connection 53 to the annular inlet chamber 70, from where it flows through hole 71, through chamber 60, hollow valve stem 67, chamber 72, into accumulator pressure tank 73. As pressure builds up in the accumulator tank 73, water will begin to back up through valve chamber 61, raising ball valve 62 to its upper seat. Water will bleed through bleeder notch 63 into expansible control chamber 65, thus balancing the pressure above and below upper piston head or washer 57, causing the entire piston assembly 56 to be driven slowly downward in the valve body 50. This action will occur since the pressure on opposite sides of the lower piston head or washer 58 is completely unbalanced, there being no water pressure therebelow.

As the piston element 56 descends in the valve body 50, the pusher member 66 will contact the upper end of the tubular valve stem 67 and thereby push the discharge valve 68 off its seat 69, as illustrated in Figure 4. In this position, the flow of water from chamber 60 into hollow valve stem 67 is temporarily curtailed, whereupon the pressure of the water in chamber 60 exerted against cup washer 74 carried upon valve stem 67, will tend to further open discharge valve 68 to provide a free and open passage for the water accumulated under pressure in tank 73, to be discharged therefrom through discharge connection 54. It will be understood that a pneumatic cushion will be formed in accumulator pressure tank 73, thus to facilitate the discharge of water accumulated under pressure therein.

While the accumulator pressure tank 73 is open to the discharge connection 54 as a result of the valve 68 being in its open position, water from expansible control chamber 65 flows downwardly past ball valve 62 in its lowermost position, and bleeds past bleeder notch 64 to mingle with water coming from accumulator tank 73 to be discharged through connection 54. The passage from inlet 53 to outlet 54 is also open.

This flow of the water from expansible control chamber 65 relieves the pressure above the upper and larger piston head or cup washer 57, so that the water pressure in annular inlet chamber 70 begins to force the piston assembly 56 upwardly. This movement is caused by the fact that the water pressure against the larger area of the upper piston head or washer 57, is greater than the pressure against the smaller area of the lower piston head or washer 58.

As the piston element 56 moves upwardly in the valve body 50, shoulder 76 within the hollow piston member 59 contacts shoulder 77 on the tubular valve stem 67, to raise and close valve 68 as illustrated in Figure 3, whereupon the non-flow accumulating phase of the cycle begins again.

The generic relationship of the two forms of valves herein set forth is entirely manifest, the principal distinction between the two being that the valve of Figures 3 and 4 is provided with an accumulating pressure tank of considerable capacity so that it stores water under pressure, providing for a more voluminous and extended flow period than is provided for in the valves of Figures 1 and 2.

If the discharge connection 54 is attached to an irrigating system such as a series of perforated pipes 78 positioned adjacent the location where water is to be supplied, then water will be delivered from the accumulator pressure tank intermittently to the irrigation distributing system. When water is first admitted to the irrigating distributing system from the accumulator pressure tank, it will be projected farthest from the perforations in the distributing pipes. As the pressure in the tank 73 decreases, the water will be projected a gradually decreasing distance from the distributing pipes, so that the area adjacent the distributing pipes within the projection capacity of the system, will be completely watered at each flow cycle of the valve.

It is manifest that a water distributing pipe would preferably be provided with water-projecting perforations or nozzles on both sides so that water would be projected therefrom laterally over an area of which the distributing pipe is the longitudinal center. A particular advantage in this intermittent application of water for irrigating purposes is that between the flow periods the water has ample opportunity to soak into the soil, which is a definite advantage over applying water continuously to a lawn or other irrigated project, which would supply water more rapidly than the soil could absorb. If the water is supplied more rapidly than the soil can soak up, it is obvious that water will run off and be wasted, besides tending to wash and erode the soil over which it flows. A relatively small amount of water applied intermittently and repeatedly irrigates the soil in an optimum manner without erosion and without waste of water. In most situations where irrigation is practiced either for lawns, gardens or any other purpose, conservation of water is an important consideration.

The duration and the volumetric capacity of the flow periods of this valve obviously may be varied by changing the size of the various components, particularly the size of the accumulator or storage pressure tank 73. The speed of the movement of the piston element may be selectively predetermined by the size of the bleeder notches 63 and 64 in the upper and lower seats respectively, of the ball valve 62.

During the discharge or flow period, water is delivered through the outlet 54 from the storage or accumulator tank 73 and from decreasing control chamber 65, and also from inlet 53 through opening 71, chamber 60 and hollow or tubular open-ended valve stem 67 which opens below valve 68 into chamber 72. Chamber 72, of course, is open to the interior of the valve housing 50 below the piston element 56 and, therefore, open to the discharge or outlet 54, when the discharge valve 68 is pushed down off its seat 69.

What I claim is:

1. An intermittent flow valve comprising a cylindrical housing element of two different adjacent internal diameters having a side inlet for liquid under pressure, the outer end of the larger diameter portion of said housing being closed and the outer part of the smaller diameter portion thereof being open to the atmosphere, a double-acting piston element inclusive of spaced heads of different diameters positioned in the cylindrical housing at opposite sides of said inlet and connected by a hollow intermediate portion of less diameter than either head, the piston element defining an annular inlet chamber within the housing and between said heads, a discharge valve in the housing adjacent said atmospheric opening but not closing said opening and having a hollow conductive discharge stem extending through said smaller piston head and into the hollow connective portion of said piston element in piston-like slidable relationship thereto, there being a conductive passage from said annular inlet chamber through a wall of said hollow connective portion into the interior of said piston element above the said stem therein, two-way bleeder means in the larger piston head establishing communication between the hollow interior of the piston element and the closed larger end portion of the cylindrical housing, means on said piston element positioned to engage said discharge valve stem to push the valve open upon movement of the piston element theretoward and to close temporarily said conductive passage through said valve stem, means in the housing to stop movement of the piston element toward said discharge valve, the valve stem being slidable by liquid pressure within the hollow piston element away from said stem-closing means when movement of the piston is so stopped, thereby establishing an open conductive passage from the interior of the piston element through the discharge valve to the atmosphere, and means on the piston element for moving the discharge valve to its closed position when said piston element moves in the opposite direction.

2. An intermittent flow valve comprising a cylindrical housing element of two different adjacent internal diameters having a side inlet for liquid under pressure, the outer end of the larger diameter portion of said housing being closed and the outer part of the smaller diameter portion thereof being open to the atmosphere, a double-acting piston element inclusive of spaced heads of different diameters positioned in the cylindrical housing at opposite sides of said inlet and connected by a hollow intermediate portion of less diameter than either head, the piston element defining an annular inlet chamber within the housing and between said heads, a discharge valve in the housing adjacent said atmospheric opening but not closing said opening and having a hollow conductive discharge stem inclusive of an enlarged chamber, extending through said smaller piston head and into the hollow connective portion of said piston element in piston-like slidable relationship thereto, there being a conductive passage from said annular inlet chamber through a wall of said hollow connective portion into the interior of said piston element above the said stem therein, two-way bleeder means in the larger piston head establishing communication between the hollow interior of the piston element and the closed larger end portion of the cylindrical housing, means on said piston element positioned to engage said discharge valve stem to push the valve open upon movement of the piston element theretoward and to close temporarily said conductive passage through said valve stem, means in the housing to stop movement of the piston element toward said discharge valve, the valve stem being slidable by liquid pressure within the hollow piston element away from said stem-closing means when movement of the piston is so stopped, thereby establishing an open conductive passage from the interior of the piston element through the discharge valve to the atmosphere, and means on the piston element for moving the discharge valve to its closed position when said piston element moves in the opposite direction.

3. An intermittent flow valve comprising a cylindrical housing element of two different adjacent internal diameters having a side inlet for liquid under pressure, the outer end of the larger diameter portion of said housing being closed and the outer part of the smaller diameter portion thereof being open to the atmosphere, a double-acting piston element inclusive of spaced heads of different diameters positioned in the cylindrical housing at opposite sides of said inlet and connected by a hollow intermediate portion of less diameter than either head, the piston element defining an annular inlet chamber within the housing and between said heads, a discharge valve in the housing adjacent said atmospheric opening but not closing said opening and having a hollow conductive discharge stem extending through said smaller piston head and into the hollow connective portion of said piston element in piston-like slidable relationship thereto, there being a conductive passage from said annular inlet chamber through a wall of said hollow connective portion into the interior of said piston element above the said stem therein, two-way bleeder means in the larger piston head establishing communication between the hollow interior of the piston element and the means on said piston element extending into said hollow valve stem and having an enlarged end portion therein, there being an end opening in the inner end of said valve stem of restricted diameter whereby said means extending into the valve stem is adapted to push the valve open and to close its conductive passage temporarily upon movement of the piston element toward said discharge valve and to move the valve to a closed position upon movement of the piston element away therefrom, means in the housing to stop movement of the piston element toward said discharge valve, the valve stem being slidable by liquid pressure within the hollow piston element away from said stem-closing means when movement of the piston is so stopped, thereby establishing an open conductive passage from the interior of the piston element through the discharge valve to the atmosphere, and means on the piston element for moving the discharge valve to its closed position when said piston element moves in the opposite direction.

4. An intermittent flow valve comprising a cylindrical housing element of two different adjacent internal diameters having a side inlet for liquid under pressure, the outer end of the larger diameter portion of said housing being closed and the smaller diameter portion thereof being open to the atmosphere, a double-acting piston element inclusive of spaced heads of different diameters positioned in the cylindrical housing at opposite sides of said inlet and connected by a hollow intermediate portion of less diameter than either head, the piston element defining an annular inlet chamber within the housing and between said heads, a discharge valve in the housing beyond said atmospheric opening but not closing said opening and having a hollow conductive discharge stem extending through said smaller piston head and into the hollow connective portion of said piston element in piston-like slidable relationship thereto, there being a conductive passage from said annular inlet chamber through a wall of said hollow connective portion into the interior of said piston element above the said stem therein, two-way bleeder means in the larger piston head establishing communication between the hollow interior of the piston element and the closed larger end portion of the cylindrical housing, means on said piston element positioned to engage said discharge valve stem to push the valve open upon movement of the piston element theretoward and to close temporarily said conductive passage through said valve stem, means in the housing to stop movement of the piston element toward said discharge valve, the valve stem being slidable by liquid pressure within the hollow piston element away from said stem-closing means when movement of the piston is so stopped, thereby establishing an open conductive passage from the interior of the piston element through the discharge valve to the atmosphere, means on the piston element for moving the discharge valve to its closed position when said piston element moves in the opposite direction, and liquid storage means connected with the smaller portion of said cylindrical housing beyond said discharge valve and in conductive communication with said valve stem for accumulating liquid under pressure.

5. An intermittent flow valve comprising a hollow housing having its interior divided into two communicating cylinders of different diameter with the outer end of the larger cylinder closed, a piston mounted for reciprocation within said cylinders and including heads having diameters corresponding to the diameters of the respective cylinders, and a hollow connecting member of lesser diameter than said heads maintaining them in spaced relation in the respective cylinders and defining with the heads and cylinder walls a liquid receiving chamber, there being an inlet for the delivery of liquid under pressure into said chamber and a conductive passage into the connecting member therefrom, two-way bleeder means in the piston establishing communication between said connecting member and the closed end of the larger cylinder, a liquid accumulating chamber at the end of the housing remote from the piston, the housing having a discharge outlet adjacent said chamber in conductive communication therewith, said accumulating chamber including a normally closed valve means controlling the flow of liquid therefrom to said outlet, said valve means comprising a stationary seat, a hollow stem mounted for movement lengthwise of the housing and a closure carried by the stem for movement onto and away from said seat, there being communicating passages through the hollow connecting member and the movable stem for the delivery of liquid from the closed end of the larger diameter cylinder into the accumulating chamber, the piston being movable by pressure of water acting on its smaller diameter portion after balancing of pressure on its larger diameter portion to a position in which its movement is communicated to the movable stem to carry the closure away from the seat and thereby discharge the accumulated liquid content of the housing.

6. An intermittent flow valve comprising a hollow housing having its interior divided into two communicating cylinders of different diameter with the outer end of the larger cylinder closed, a piston mounted for reciprocation within said cylinders and including heads having diameters corresponding to the diameters of the respective cylinders, and a hollow connecting member of lesser diameter than said heads maintaining them in spaced relation in the respective cylinders and defining with the heads and cylinder walls a liquid receiving chamber, there being an inlet for the delivery of liquid under pressure into said chamber and a conductive passage into the connecting member therefrom, two-way bleeder means in the piston establishing communication between said connecting member and the closed end of the larger cylinder, a liquid accumulating chamber at the end of the housing remote from the piston, the housing having a discharge outlet adjacent said chamber in conductive communication therewith, said accumulating chamber including a normally closed valve means controlling the flow of liquid therefrom to said outlet, said valve means comprising a stationary seat, a hollow stem mounted for movement lengthwise of the housing and a closure carried by the stem for movement onto and away from said seat, there being communicating passages through the hollow connecting member and the movable stem for the delivery of liquid from the closed end of the larger diameter cylinder into the accumulating chamber, the piston being movable by pressure of water acting on its smaller diameter portion after balancing of pressure on its larger diameter portion to a position in which its movement is communicated to the movable stem to carry the closure away from the seat and thereby discharge the accumulated liquid content of the housing, and means for closing the valve after discharge of the liquid content.

WILLIAM S. WHITE.